(12) United States Patent
Djuric

(10) Patent No.: US 6,785,546 B1
(45) Date of Patent: Aug. 31, 2004

(54) METHOD AND APPARATUS FOR CONTROLLING APPLICATION PROCESSOR OCCUPANCY BASED TRAFFIC OVERLOAD

(75) Inventor: Mirko Djuric, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/526,790

(22) Filed: Mar. 16, 2000

(51) Int. Cl.$^7$ .................................................. H04Q 7/20
(52) U.S. Cl. ........................ 455/445; 455/453; 455/422
(58) Field of Search ................................. 455/445, 453, 455/450, 422, 522, 560, 575.1, 550.1, 424, 9, 67.1, 458, 528; 379/111, 230, 269, 220, 219, 113, 221, 221.06, 221.07, 224, 112.06; 707/10; 709/100–332

(56) References Cited

U.S. PATENT DOCUMENTS

| 4,974,256 A | * 11/1990 | Cyr et al. .................... 379/113 |
| 4,979,118 A | * 12/1990 | Heradpir ...................... 364/436 |
| 5,754,639 A | * 5/1998 | Flockhart et al. ............ 379/221 |
| 6,064,892 A | * 5/2000 | Miyagawa et al. .......... 455/560 |
| 6,240,287 B1 | * 5/2001 | Cheng et al. ................ 455/422 |
| 6,438,374 B1 | * 8/2002 | Bhat ........................... 455/423 |

OTHER PUBLICATIONS

B. Hajek, *Mathematics of Operations Research*, "External Splitting of Point Processes", vol. 10, No. 4, pp. 543–556 (Nov. 1985).

* cited by examiner

Primary Examiner—Edward F. Urban
Assistant Examiner—C. Chow (57) ABSTRACT

This invention relates to a method and apparatus for controlling application processor occupancy based traffic overload. More particularly, the invention is directed to a system to maintain call processing related traffic below a predefined threshold in application processors that are typically incorporated into communication networks.

10 Claims, 6 Drawing Sheets

METHOD AND APPARATUS FOR CONTROLLING APPLICATION PROCESSOR OCCUPANCY BASED TRAFFIC OVERLOAD

BACKGROUND OF THE INVENTION

This invention relates to a method and apparatus for controlling application processor occupancy based traffic overload. More particularly, the invention is directed to a system to maintain call processing related traffic below a predefined threshold in application processors that are typically incorporated into communication networks. The system is an improvement over prior systems in that it incorporates a centralized decision making process for accepting and rejecting calls by the application processor, utilizes an improved splitting sequence in this regard, and bases decisions on an estimation of actual overload conditions.

While the invention is particularly directed to the art of controlling call processing traffic overload in application processors, and will be thus described with specific reference thereto, it will be appreciated that the invention may have usefulness in other fields and applications. For example, the invention may be used to control data traffic in a variety of different processing components where centralizing decision-making and estimating actual overload is desired.

By way of background, application processors (APs) are typically used in wireless communication networks. Call processing related traffic in these application processors is processed by a number of radio cluster server (RCS) processes that are running on the application processor and communicating with microcells assigned to each. Typically, the RCSs do not balance the call related traffic among themselves nor do they store any knowledge about the traffic load distribution among the RCSs. In order to maintain the processed traffic under some predefined threshold, a splitting process is applied to dictate the manner in which the current traffic should be controlled in each of the RCSs. Splitting processes are a widely accepted approach and are based on generating a sequence of zeros and ones. A zero (0) is an instruction to discard a call and a one (1) is an instruction to accept it.

Improvements in controlling traffic in these circumstances is desired. As such, the present invention contemplates a new and improved method and apparatus for controlling application processor occupancy based traffic overload.

SUMMARY OF THE INVENTION

A method and apparatus for controlling application processor occupancy based traffic overload are provided. The invention is generally applicable to an application processor of a communication network. The network includes microcells communicating with the application processor, which is also connected to other portions of the network. The application processor comprises a central processing unit having a total load capacity of which at least a portion is uncontrollable and a plurality of radio cluster servers communicating with the microcells.

In one aspect of the invention, the method comprises the steps of monitoring a number of call requests to the radio cluster servers from the microcells, determining a total load of the central processing unit based on the number of call requests and the uncontrollable portion, determining whether an overload condition exists based on the determining of the total load, determining an acceptance rate for the call load if the overload condition exists, determining a splitting sequence for the application processor based on the acceptance rate, and, determining whether call requests are accepted or rejected based on the splitting sequence.

An apparatus implementing the method of the present invention is also provided.

A primary advantage of the present invention is that overall performance of the application processor will be improved inasmuch as controlling the overload condition in this way results in smoother, more consistent operation.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention relates to significant improvements in the art of controlling application processor occupancy based traffic overload. First, the present invention incorporates a centralized decision making process for accepting and rejecting calls by the application processor. This is accomplished by utilizing overload control processes which monitor the usage of all RCSs present within the application processor. Second, an improved splitting sequence is implemented. This splitting sequence is, in turn, utilized for the entire system on a centralized basis. Third, the present invention bases certain decisions on an estimation of actual overload conditions (i.e. predicting, for example, 150% overload) as opposed to simply recognizing an overload condition (i.e. only determining that the processor is in "overload" but not determining the extent to which overload is present).

These are significant improvements in the art because implementation thereof allows the application processor to compensate for overload conditions within a single control interval. Accomplishing this results in a balanced and consistent operation of the processor inasmuch as the likelihood of the processor initiating an undesired rebooting process is substantially reduced.

Figure 1:
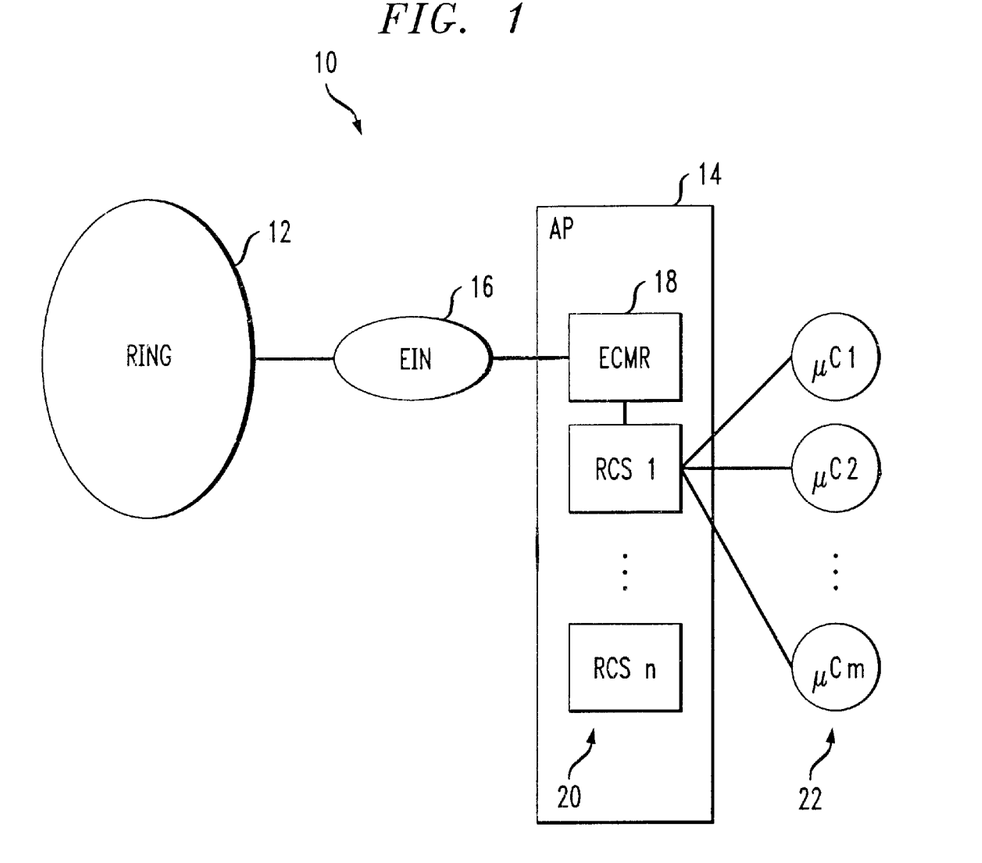
FIG. 1 illustrates a system to which the present invention may be applied.

Referring now to the drawings wherein the showings are for purposes of illustrating the preferred embodiments of the invention only and not for purposes of limiting same, FIG. 1 provides a view of a system 10 to which the present invention may be applied. As shown, all the traffic related messages coming from a ring communication network 12 are delivered to an application processor 14 through an interface 16, such as an ethernet interface node (EIN). The application processor 14 has an executive cellular processing communication manager (ECMR) 18 which distributes calls to a plurality of RCSs 20. As noted above, the RCSs are also in communication with a plurality of microcells 22.

The application processor 14 is a single processor machine that runs the AP platform consisting of several processes that must be running continually and without any considerable disruptions. In this regard, the AP platform runs a number of critical processes that are observed through a "heartbeat" mechanism. If, for a particular critical process, the heartbeat message is absent for more than some predefined time, a so-called Sanity Monitor will be forced to terminate that process. This absence of the heartbeat message could be caused by aggressive processes burning more CPU time than allowed and failing to leave any CPU cycles to the critical process. Significantly, "killing" a critical process will trigger the AP to reboot. So, it is desired to allow the RCS processes to burn some amount of the AP CPU time without exceeding a predefined threshold. In the prior systems, the RCS processes were unable to balance the traffic among themselves and did not have any knowledge about the traffic not processed on them. The priorities of the RCS processes, from the AP operating system point of view, are the same.

Typically, when a call is originated, the AP (i.e. one of its RCSs) is required to process a number of messages. If the RCS decides to discard the call, then only one message particular to this call will be processed. If the call is accepted, then a number of messages generated starting with the call origination and ending with the call termination must be processed during the call duration time. So, the present invention takes into account the AP CPU time that will be burned by the processes that cannot be controlled; at all, the time burned by the calls accepted and in progress, and the time burned by all the processes controlled and not related to the call processing at all. This amount of the AP CPU time will be referred to marked as the uncontrollable portion.

Figure 2:
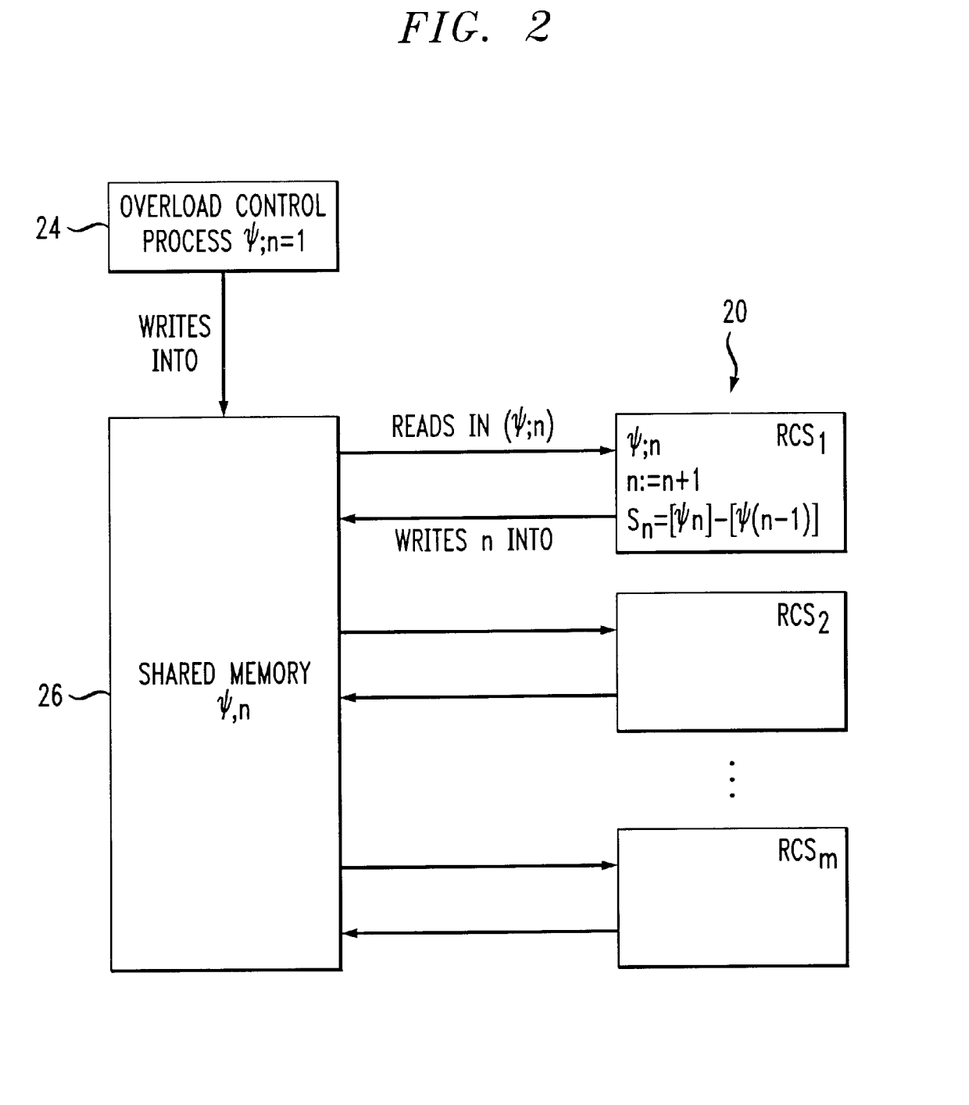
FIG. 2 illustrates an embodiment of the present invention within the system of FIG. 1.

Referring now to FIG. 2, the improvement of the present invention as applied to the system of FIG. 1 is illustrated. More particularly, the RCSs 20 of the application processor 14 are operatively connected to an overload control module 24 which is connected to a shared memory segment 26. The overload control module 24 writes an acceptance rate $\psi$ and initial integer value n=1 into the shared memory. As can be seen, each RCS accesses the shared memory with specific call requests and the call requests are accepted or rejected by the overload control module through the shared memory based on a splitting sequence Sn, which is stored in each RCS. A zero (0) in the splitting sequence indicates that a call should be rejected while a one (1) in the splitting sequence indicates that a call should be accepted. It should be appreciated that the splitting sequence is utilized in sequential order by the plurality of RCSs 20. That is, a call request from RCS 2 may coincide with the first zero (0) in the splitting sequence so that call will be rejected while the subsequent call request of RCS 1 will result in an acceptance of a call because of a succeeding one (1) in the splitting sequence. As shown, the RCSs read the acceptance rate and integer n from the shared memory for purposes of determining the applicable splitting sequence information. The RCS, e.g. RCS 1 as illustrated, then increments n and writes the new n back into the shared memory. This process allows for all RCSs to share the splitting sequence and balance the load on the AP. A variety of suitable processes and configurations—which will be apparent with an understanding of the present invention—may be used to implement these techniques. However, a significant advantage of the preferred system is that it centralizes the decision making process for accepting and rejecting calls and allows for improved operation of the application processor.

FIGS. 1 and 2 provide an overview of the present invention as applied to an application processor. However, further details of the invention are described hereafter. These details include the basic mathematical model of the invention, splitting sequence selection and use, acceptance rate calculation (which is used to calculate the splitting sequence), separation of time intervals, estimation of CPU occupancy and other advantageous features of the present invention.

Basic Mathematical Model

The preferred queuing model, chosen as the mathematical abstraction of the call processing related traffic running on the AP, is based on a sequence of messages (e.g. to ECMR 18 from the RING 12 and distributed to RCS processes) arriving at rate $\lambda$ according to a renewal point process (the call processing, in this case)—i.e. the interarrival times of the messages are independent, identically distributed random variables with finite mean $1/\lambda$. This is illustrated in FIG. 3.

Figure 3:
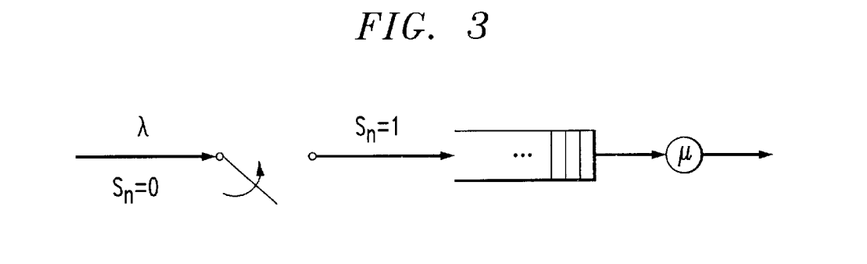
FIG. 3 is a graphic illustration of the use of a splitting sequence.

With continuing reference to FIG. 3, suppose that a deterministic, zero-one valued sequence $S_n$, called the "splitting sequence", is given. For each n the one (nth) message is admitted to be processed by an RCS process if $S_n=1$ and not admitted if S=0. The RCS process behaves as an exponential server with mean service time $1/\mu$. This definition of an optimal splitting sequence is defined in B. Hajek, "External Splitting of Point Processes," *Mathematics of Operations Research*, Vol 10, No. 4, pp. 543–556 (November 1985), which is hereby incorporated herein by reference.

Splitting sequence choice

More particularly, the preferred choice for a splitting sequence is $$S_n = \lfloor n\psi \rfloor - \lfloor (n-1)\psi \rfloor; n=1,2,\ldots \quad (1)$$

Those skilled in the art will appreciate that this splitting sequence results in improved and efficient performance.

Splitting sequence use

Generally, two strategies for using the preferred splitting sequence are possible:

i) For each process generating the call load, use separate $S_n$ sequence.

ii) For all processes generating the call load use a single unique $S_n$ sequence.

That is, each RCS process, before deciding to accept or shed a call, must know the latest (previous) decision no matter which RCS process used that decision.

It should be understood that Strategy i) does not provide optimal use of the splitting sequence. In addition, Strategy ii) provides a more accurate acceptance rate than Strategy i). In this regard, if A(x) denotes the number of messages that arrive during any time interval of length x, the following distribution exists.

$$p(\lambda, k) = Prob[A(x) = k]; k = 1, 2, \ldots$$

Suppose a number of processes at $\lambda_1, \lambda_2, \ldots$ rates merged into single process at $\lambda = \lambda_1 + \lambda_2 + \ldots$ Let $Z_n$ be the number of the ones of a splitting sequence up to and including the nth element. From (1), it follows that $Z_n = [n\psi]$. Obviously $$Z_n \geq Z_{n-k} + Z_k \quad (2)$$

Suppose the two processes at $\lambda_1$ and $\lambda_2$ are merged together into the one at $\lambda = \lambda_1 + \lambda_2$. Clearly, then $$p(\lambda, n) = \sum_{k=0}^{n} p(\lambda_1, n-k) p(\lambda_2, k)$$

i.e.

$$\sum_n Z_n p(\lambda, n) \geq \sum_n \sum_{k=0}^{n} (Z_{n-k} + Z_k) p(\lambda_1, n-k) p(\lambda_2, k) \quad (3)$$

(2) indicates that the acceptance rate of the merged process is larger than the sum of the acceptance rates of the separate processes. Suppose the merged process contains m separate processes. It is apparent (by induction) to generalize (2) and get $$Z_n \geq \sum_{j=1}^{m} Z_{i_j}; \sum_{j=1}^{m} i_j = n; m = 1, 2, \ldots \quad (4)$$

From (4) immediately follows $$\sum_n Z_n p(\lambda, n) \geq \sum_n \left( \sum_{j=1}^{m} Z_{i_j} \right) \prod_{j=1}^{m} p(\lambda_j, i_j); \sum_{j=1}^{m} i_j = n; m = 1, 2, \ldots \quad (5)$$

QED.

Therefore, the merged process has a higher acceptance rate than the sum of the acceptance rates of the separate processes. As such, the preferred use of a splitting sequence is that of Strategy ii). In this way, all RCS processes sequentially access the same splitting sequence for determining whether to accept or reject a call.

Calculation of Acceptance Rate for Controlled Load

Given a preferred splitting sequence and a preferred strategy for using the splitting sequence, calculation of acceptance rate becomes relevant for purposes of ultimately controlling traffic in the AP. In this regard, if $\rho$ represents the call processing related CPU occupancy and $\psi$ the acceptance rate, then the following routine calculates the acceptance rate y for the next observation interval.

Routine 1.

1. Wait until $\rho > \rho_{max}$. Set i=1. Suppose that acceptance rate is 100% when $\rho$ becomes larger than $\rho_{max}$. In that case, try to decrease the CPU occupancy to the level of $\rho_{max}$ i.e.

$$\frac{100}{\rho} = \frac{\psi_i}{\rho_{max}} \text{ i.e. } \psi_i = \frac{\rho_{max}}{\rho}$$

2. Next observation interval. Calculate the new $\rho$ and $\psi_{i+1}$ following the logic seen in 1.

$$\frac{\psi_i}{\rho} = \frac{\psi_{i+1}}{\rho_{max}} \text{ i.e. } \psi_{i+1} = \psi_i \frac{\rho_{max}}{\rho}$$

If $\psi_{i+1} < 100$ then replace $\psi_i$ by $\psi_{i+1}$ and go to step 2. Otherwise, go to step 1.

In order to keep this routine meaningful, a small positive number is assigned to $\psi_i$ (for example, $\psi_y = 0.0001$) whenever $\psi_i = 0$ for some i, and $\psi_i = \min\{\psi_i, 100\}$ is used if ever $\psi_i > 100$ for some i.

If $\psi_{i+1} = \psi_i$ $S_n$ is calculated by not resetting n to 1; otherwise, reset n to 1 and calculate $S_1$ for i+1th observation interval.

Calculation of Acceptance Rate—Considering Uncontrolled Portion of the Load

The Routine 1 given above used to calculate the acceptance rate works if there is no uncontrolled portion of the CPU load, i.e. if the whole CPU load is controllable. However, this approach has little practical application because the uncontrolled portion of a load is typically an issue.

Suppose $\rho_{unc}$ is an amount of the CPU load that is not controllable and burns $\rho_{unc}\%$ of the overall CPU time. In this case, the routine above is preferably replaced by the following.

Routine 2

1. If $\rho > \rho_{unc}$ then $\alpha = \rho - \rho_{unc}$ is the controllable portion of the CPU load else exit;
2. If $\rho > \rho_{unc}$ then $b = \rho - \rho_{max}$ is the amount of the excessive load that shall be shed else exit;
3. In this case $\alpha - b$ is a desired level of the controlled load that might be processed. So $\alpha - b = \rho_{max} - \rho_{unc}$, and assuming the initial (i=0) $\psi_0 = 100$ (the acceptance rate was equal 100%), $$\frac{\alpha}{\psi_i} = \frac{\alpha - b}{\psi_{i+1}} \text{ i.e. } \frac{\rho - \rho_{unc}}{\psi_i} = \frac{\rho_{max} - \rho_{unc}}{\psi_{i+1}} \text{ i.e.}$$

i.e. calculate $\psi_{i+1}$:

$$\psi_{i+1} = \frac{\psi_1 (\rho_{max} - \rho_{unc})}{\rho - \rho_{unc}}$$

If $\rho_{unc} = 0$ (all the load is controllable), then $\psi_{i+1} = \psi_i \rho_{max} \rho$ as it was before.

4. Apply $\psi_{i+1}\%$ acceptance rate during the next control interval. If the overload state persists, replace $\psi_i$ by $\psi_{i+1}$ and calculate the new $\psi_{i+1}$ for the next control interval.

Interestingly, those skilled in the art will appreciate that the same correction (as that one of Routine 1) of the $\psi_i$ will be applied whenever $\psi_i = 0$ or $\psi_i > 100$.

Separation of the observation and control intervals

Figure 4:
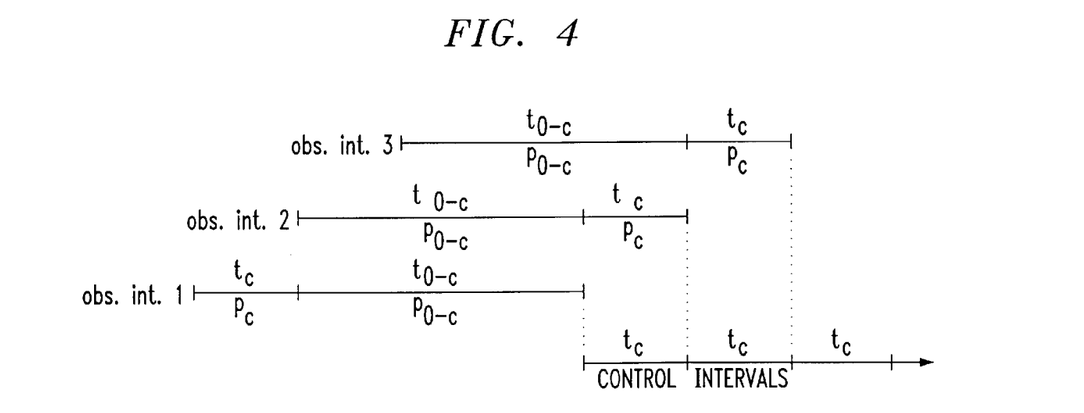
FIG. 4 is a graphic illustration of the observation interval length calculation preceding a particular control interval.

In order to make a decision at the beginning of a control interval, a sufficiently long observation interval preceding the control interval is preferred to be able to calculate a "good" $\rho$. So, the same interval (T second long) for AP CPU occupancy measurement and the decision making is not used. Referring now to FIG. 4, those skilled in the art will appreciate that the important considerations are 1) knowledge of the AP CPU occupancy during only one observation interval adjacent and preceding the control interval and 2) the decision made at the beginning of the previous control interval.

The preferred manner in which to calculate $\rho$ based on the logic visible in FIG. 4 is straightforward:

$$\rho = \frac{t_c \rho_c + t_{o-c} \rho_{o-c}}{t_c + t_{o-c}} \qquad (6)$$

Obviously, it is preferred that the observation interval be longer than control interval. The reason is that there must be relatively quick reaction to a determination that the AP CPU is in overload state. As such, the decision should be based on reliable data (i.e. observation interval must be long enough to provide information for a reliable processor occupancy estimate).

To take into account the various time intervals discussed above, the following Routine 3 runs constantly in the system and selectively implements the routine 1 or 2 above and the routine 4, to be described hereafter.

1. Measure the traffic during some interval $[\tau, \tau+t_o]$ starting with some initial $\tau$.
2. Calculate $\rho$ (by using formula (6)) and $\psi$ (Routine 1 or Routine 2) for the given. $[\tau, \tau+t_o]$ interval.
3. Use $\psi$ calculated in the previous step in order to control the traffic within $[\tau+t_o, \tau+t_o+t_c]$ interval. Measure traffic within $[\tau+t_o, \tau+t_o+t_c]$ interval, replace $\tau$ by $\tau+t_c$ and go to step 1.

Traffic level estimation within a control interval

In order to estimate traffic in step 3 above, the very first step is to learn the ratio of the AP CPU time burned by the processes involved in the call processing related overload control that is not controllable. There are the two types of the uncontrollable load. The first one is the activity within the controlled processes (RCSs) supporting the call processing for which AP CPU time consumption is constant, i.e. does not follow the changes in the number of the calls generated. The second type comes from the calls already accepted and not completed before the control interval start. A call once accepted will generate a number of the messages that must be processed by the RCSs during the call holding time. This second type can be estimated by comparing the control interval length with the average call holding time. After calculating AP CPU occupancy at the end of the observation interval and learning the number of the calls generated within that interval, the real amount of the AP CPU load (during the next control interval) can be estimated by using Routine 4.

1. Whenever an RCS process decides to accept a call, it shall increment a counter (placed in the shared memory segment) common to all the processes.
2. At the end of the observation interval, the OC process shall read the counter and calculate the AP CPU occupancy for the current observation interval.
3. If it appears that AP CPU occupancy is under 100%, an average AP CPU consumption per call shall be calculated and used to correct the already known (given) average.
4. If it appears that AP CPU occupancy equals to 100%, use the number of the accepted calls in order to calculate the real (controllable amount of the) AP CPU occupancy.
5. Whenever the AP is in the overload state, use the Routine 2 in order to calculate the new $\psi$.

Uncooperative behavior of the processes controlled by overload control routine

Here, a simple example will explain the idea of uncooperative behavior and its consequences in the system. If a process is burning 60% of the AP CPU time and a number of the other processes (8 or more) each burning 3% of the AP CPU time, the AP will be in an overload state ($\rho_{max}=80\%$). The first process, burning 60% of the AP CPU time, will be running continually, and the rest of them will be brought up at the same time and last only 60 seconds. Assume that all processes are uncooperative, i.e. they do not like to shed the calls to the extent defined by the acceptance rate. If the AP is not in the overload state as soon as the criterion $\rho < \rho_{max}$ and $\psi < 100\%$ is met, then, even the AP is not in overload state, the routine will keep thinking as if it were. Observation and control intervals are of the same length (10 sec., $\rho_{max}=80\%$). See the next two examples.

| Example 1 | | Example 2 | |
|---|---|---|---|
| $\rho = 61\%, \psi = 100\%$ | | $\rho = 60\%, \psi = 100\%$ | |
| $\rho = 81\%, \psi = 98\%$ | | $\rho = 82\%, \psi = 97\%$ | |
| $\rho = 87\%, \psi = 90\%$ | | $\rho = 87\%, \psi = 89\%$ | |
| $\rho = 87\%, \psi = 82\%$ | | $\rho = 87\%, \psi = 81\%$ | |
| $\rho = 87\%, \psi = 75\%$ | | $\rho = 87\%, \psi = 74\%$ | |
| $\rho = 84\%, \psi = 71\%$ | | $\rho = 87\%, \psi = 68\%$ | |
| $\rho = 78\%, \psi = 72\%$ | | $\rho = 75\%, \psi = 72\%$ | |
| $\rho = 60\%, \psi = 95\%$ | | $\rho = 60\%, \psi = 95\%$ | |
| $\rho = 60\%, \psi = 100\%$ | | $\rho = 60\%, \psi = 100\%$ | |

So, if the processes behave badly, the AP might remain longer in the overload state even when the traffic is really under the threshold ($\rho_{max}$).

Figure 5:
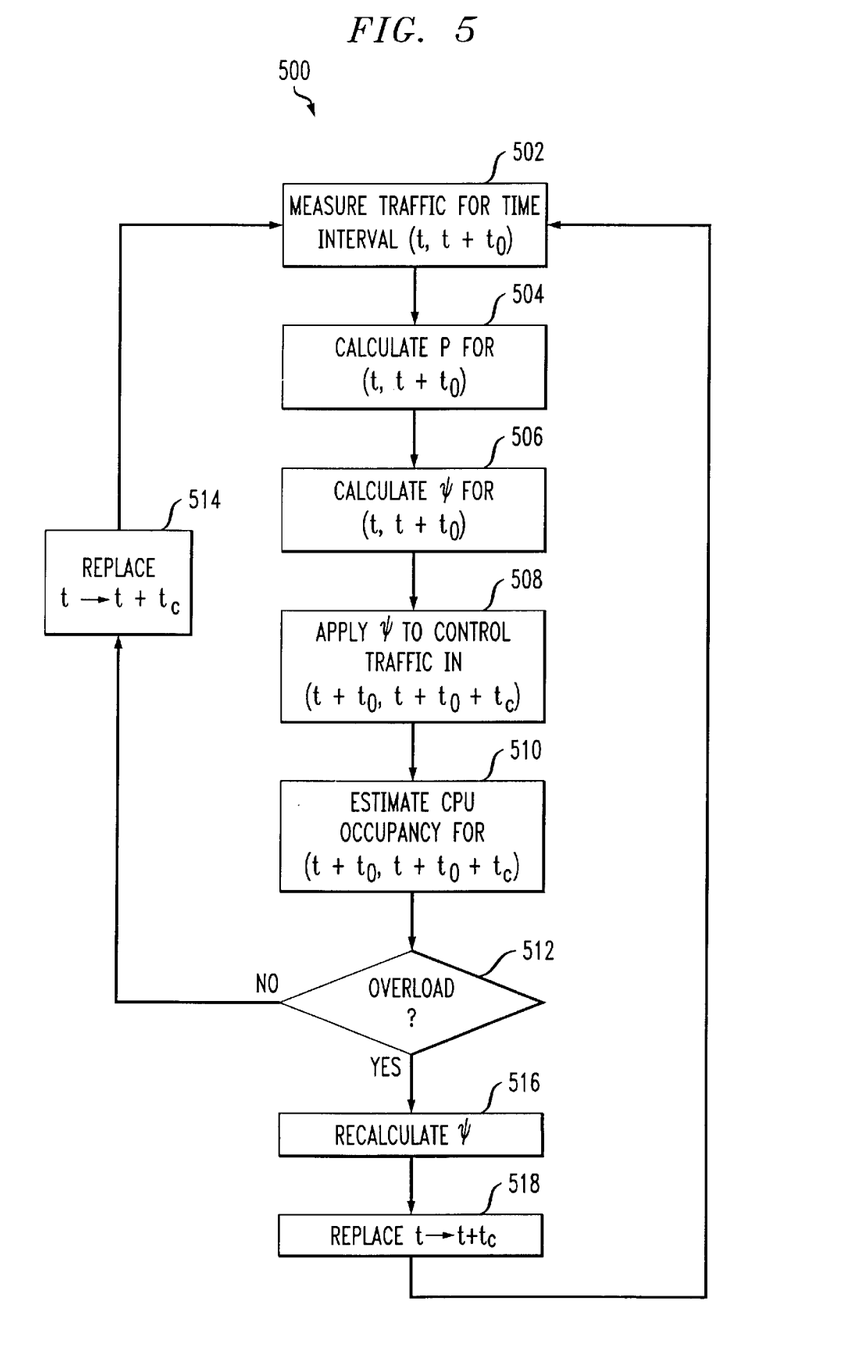
FIG. 5 is a flow chart illustrating the overall preferred method of the present application.

Nonetheless, the use and interaction of the above referenced routines 1–4 can be more clearly understood with reference to FIG. 5. It should be appreciated that the process described in connection with FIG. 5 includes selective manipulation and interaction of the routines described in the present application. This process and the routines are implemented using known software and hardware techniques that will be apparent to those skilled in the art upon a reading of the specification hereof.

In this regard, the application processor initiates the process 500 of the present invention which reflects the constantly running routine 3 above by measuring traffic for a time period (step 502). CPU occupancy $\rho$ is then calculated (using the formula above) (step 504). The acceptance rate is also calculated using either Routine 1 or 2; preferably, routine 2 (step 506). Acceptance rate is then used to control traffic in the next interval (step 508). An estimation of traffic for that next interval is then accomplished using routine 4 (step 510) and a determination is made whether an overload state exists (step 512). If there is no overload state, the process resumes for subsequent time intervals by incrementing the time period (step 514). If there is an overload condition, an acceptance rate is recalculated using Routine 2 (step 516) and then the process resumes for subsequent time intervals (step 518).

EXAMPLES

The present invention and its clear advantages can be illustrated by way of example. As such, the following numerical examples of the operation of the system are included.

Example 1

As noted above, one of the serious consequences of the use of Strategy i) in use of splitting sequences is the obtainment of a lower acceptance rate than required. This lower acceptance rate drives the overload control routine into instability. To illustrate that, using the Routine 1, $\psi_i$ for both strategies is calculated assuming always $\psi_i < 100$.

Strategy i)—stability questionable

1. At the very beginning, i.e. we entered overload state: if $\rho_1 > \rho_{max}$ then $\psi_{1=\rho max} \rho_1$. Due to Proposition above, the real acceptance rate will be lower than $\psi 1$. If the real traffic remains constant (i.e. equal $\rho_1$) then at the end of this decision interval $\rho_2 = \psi_1 \rho_1 - \epsilon$ where $\epsilon$ represents an error introduced by Strategy i).

2. At the beginning of the second observation interval $$\psi_2 = \psi_1 \frac{\rho_{max}}{\rho_2} = \psi_1 \frac{\rho_{max}}{\psi_1 \rho_{max} - \varepsilon} > \frac{\rho_{max}}{\rho_1} = \psi_1$$

So, $\psi_2 > \psi_1$;

For practical computational purposes, we'll take $p(\lambda + k) = e^{\lambda t}(\lambda t)^k/k!$; $k=0, 1, 2, \ldots$ If we have 21 RCSs running on AP where the overall call load is given by $\lambda = 0.9$, the threshold $\rho_{max} = 0.8$ and $\lambda_1 = 0.05$; $\lambda_2 = 0.04$; $\lambda_3 = 0.03$; $\lambda_4 = 0.02$; $\lambda_5 = 0.01$; $\lambda_6 = 0.06$; $\lambda_7 = 0.07$; $\lambda_8 = 0.08$; $\lambda_9 = 0.09$; $\lambda_{10} = 0.01$; $\lambda_{11} = 0.02$; $\lambda_{12} = 0.03$; $\lambda_{13} = 0.04$; $\lambda_{14} = 0.05$; $\lambda_{15} = 0.06$; $\lambda_{16} = 0.07$; $\lambda_{17} = 0.08$; $\lambda_{18} = 0.01$; $\lambda_{19} = 0.01$; $\lambda_{20} = 0.01$; $\lambda_{21} = 0.06$ for a period T=10 sec long—$\epsilon$ will be 6.79932−2.14077=4.65855, i.e. 4.65855 messages out of 6.79932 (=the number of the messages that should be accepted) will be discarded additionally.

Strategy ii)—no problem; stability achieved
1. At the very beginning, i.e. we entered overload state: if $\rho_1 > \rho_{max}$ then $\psi_1 = \rho_{max}/\rho_1$. If the real traffic remains constant (i.e. equal $\rho_1$) then at the end of this decision interval $\rho_2 = \psi_1 \rho_1$.
2. At the beginning of the second observation interval $\rho_2 = \rho_1$. So, $\psi_2 = \psi_1$.

Example 2

The Routine 2 is an advantageous upgrade of the proposed mathematical model because it considers uncontrollable load. To illustrate its importance, we'll give the two simple numerical examples. Initially, assume that traffic is enough to burn 150% of the AP CPU time, as before. Suppose that 10% of CPU time will be burned by the processes having higher priorities than the call processing processes, 50% is the load inherited from the previous observation interval, and the rest, up to 20%, is available for all the newly generated calls within a current (the first) observation interval. Also, suppose that the maximally permissible AP CPU occupancy is 80%.

First use the Routine 1. According to the Routine 1, there is no knowledge about the scope of the uncontrollable AP CPU load.
1) Due to the fact that there is one CPU, it will be occupied 100% at the beginning of the first observation interval. So, the initial acceptance rate will be $\psi_0 = 100\%$.
2) It is desirable to decrease the AP CPU occupancy. So, calculate $\psi_1 = 8000/100 = 80$. It means in the next observation interval, the controllable 50% of the CPU occupancy will be downsized to 90%*0.8=72%. So uncontrollable plus accepted load will be 60%+72%=132% and AP CPU will be 100% busy again. Continuing the same way we will have:

3)$\psi_2 = 80*80/100 = 64$; 90%*0.64=57.6%;
Uncontrollable plus accepted load=60%+57.6%=117.6%, AP CPU occupancy=100%.
4) $\psi_3 = 64*80/100 = 51.2$; 90%*0.512=46.08%,
Uncontrollable plus accepted load=60%+46.08%=106.08%, AP CPU occupancy=100%.
5) $\psi_4 = 51.2*80/100 = 40.96$; 90%*0.4096=36.864%,
Uncontrollable plus-accepted load=60%+36.864%=96.864%, AP CPU occupancy=96.864%.
6) $\psi_5 = 40.96*80/96.864 = 33.829$; 90%*0.33829=30.446%,
Uncontrollable plus accepted load=60%+30.446%=90.446%, AP CPU occupancy=90.446%.
7) $\psi_6 = 33.829*80/90.446 = 29.922$; 90%*0.29922=26.930%,
Uncontrollable plus accepted load=60%+26.930%=86.930%, AP CPU occupancy=86.930%.

8) $\psi_7 = 29.922*80/86.930 = 27.537$; 90%*0.27537=24.830%,
Uncontrollable plus accepted load=60%+24.830%=84.830%, AP CPU occupancy=84.830%.

Figure 6:
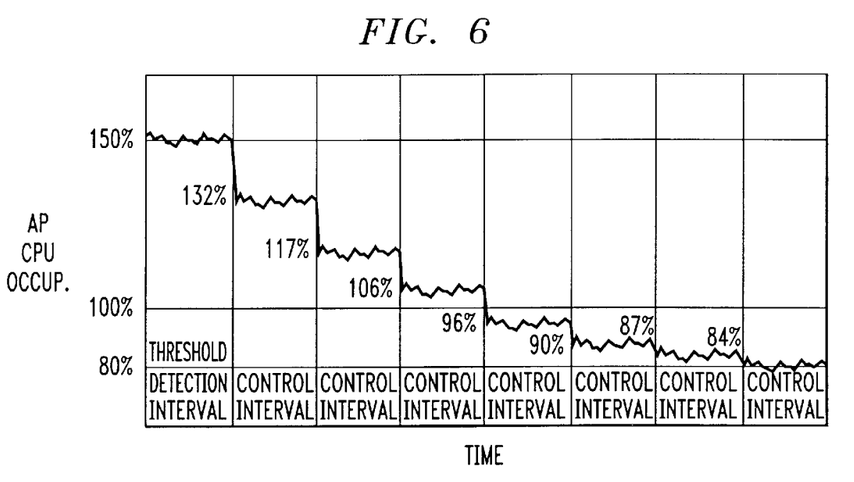
FIG. 6 is a graphic illustration of a numeric example illustrating the advantages of the present invention.

So, considering that at least 10 seconds to detect the AP overload state is needed, another 40 seconds will also be needed to bring the AP CPU occupancy under 100%, and another 40 seconds to bring the load under the threshold. This will require too much time and the AP will be rebooted. This is illustrated in FIG. 6.

In the following case, use the Routine 2. So, take into account that 60% of the AP CPU load is not controllable at all.

When entering the overload state (after some period of the underload state) for the first time:
$\rho = 100\%$ (based on the simple fact the hypothetical 150% is not measured in this example)

$\rho_{unc} = 60\% \ \Psi_1 = 50\%$

Figure 7:
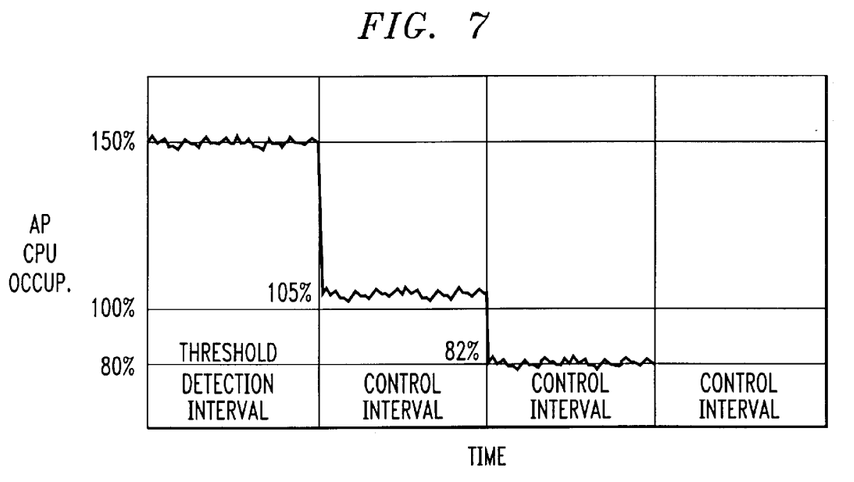
FIG. 7 is another graphic illustration of an example illustrating the advantages of the present invention; and, FIG. 8 is another graphic illustration of an example illustrating the advantages of the present invention.

Interpreting the data above, within the next control interval, the real traffic will be able to burn 60%+50%*90%=105% of the CPU time perceived as 100% CPU occupancy again. So $\rho = 100\% \ \rho_{unc} = 60\% \ \Psi_1 = 25\%$ Now, the real traffic will burn 60%+90%* 25%=82.5% of the CPU time. So $\rho = 82.5\% \ \rho_{unc} = 60\% \ \Psi_3 = 22.5\%$ and the real traffic will be burning 60%+22.5%*90%=80.25%. In this case, we needed 30 seconds is needed to bring the load under 100% (compared to 50 seconds in the Numerical example 1) and only 10 seconds more to decrease the load to the threshold level in order to provide the stable conditions for the AP CPU. This is illustrated in FIG. 7.

If, within the first control interval of the overload state, the AP CPU occupancy is less than 100%, the Routine 1 will need more than one step to be able to bring down the AP load under a predefined threshold provided there is an uncontrollable amount of the AP load. The Routine 2 will accomplish the task within a single step.

Presuming that within the first control interval of the overload state the CPU occupancy reported is 100%, both the routines will need more than one control interval to be able to bring down the traffic close to the CPU occupancy threshold. From the examples given earlier, it is obvious that the Routine 2 is more efficient than the Routine 1. The question is how to make the Routine 2 even more effective. One remedy is to introduce a coefficient (<1) that will multiply the $\Psi_1$ after calculating the $\Psi_i$ and use that product instead of $\Psi_1$.

An example. If we multiply $\Psi_2$ by 0.5, the traffic in the next control interval will be 60%+0.9*25=82.25%—very close to the desired (80%) threshold. Going further, and not forgetting that we are under 100% of the AP CPU occupancy, we'll get $\Psi_3 = 22.22\%$ and the new AP CPU occupancy will be 60%+0.9*22.22%=80%.

Figure 8:
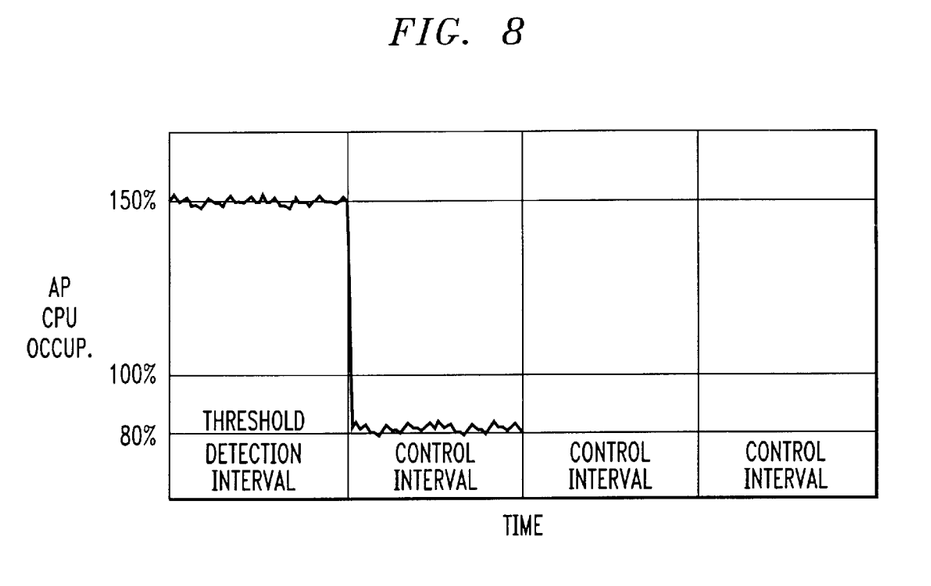

Another way to more efficiently use routine 2 is to embed this process within routine 4 to be used in appropriate circumstances, as is also illustrated in connection with the overall flowchart of FIG. 5. Implementing the routine in this manner will result in an appropriate correction of an overload condition within one control interval, as illustrated in FIG. 8.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

What is claimed is:

1. A method for controlling call traffic in an application processor of a communication network, the network including microcells communicating with the application processor which is also connected to other portions of the network, the application processor comprising a central processing unit having a total load capacity of which at least a portion is uncontrollable and a plurality of radio cluster servers communicating with the microcells, the method comprising steps of:

monitoring a number of call requests to the radio cluster servers from the microcells;

determining a total load of the central processing unit based on the number of call requests and the uncontrollable portion;

determining whether an overload condition exists based on the determining of the total load;

determining a first acceptance rate for the call load if the overload condition exists;

setting a second acceptance rate approximately equal to 100% for the call load if the overload condition does not exist;

determining a single splitting sequence for the application processor based on one of the first and second acceptance rates; and, determining whether call requests are accepted or rejected based on the splitting sequence.

2. A method for controlling called traffic in an application processor of a communication network, the network including microcells communicating with the application processor which is also connected to other portions of the network, the application processor comprising a central processing unit having a total load capacity at least a portion of which is uncontrollable and a plurality of radio cluster servers communicating with the microcells, the method comprising steps of:

(a) measuring call traffic in a first time interval;

(b) calculating CPU occupancy for the first time interval based on the measured called traffic and the uncontrolled portion of the CPU load;

(c) calculating a first acceptance rate for the first time interval based on the CPU occupancy;

(d) applying the first acceptance rate for a second time interval;

(e) estimating CPU occupancy for the second time interval;

(f) determining if an overload condition exists based on the estimated CPU occupancy for the second time interval;

(g) calculating actual CPU occupancy for the second time interval if the overload condition exists; and, (h) calculating a second acceptance rate for the second time interval based on the actual CPU occupancy if the overload condition exists.

3. The method as set forth in claim 2 further comprising repeating steps (a)–(h) for subsequent time intervals to update the control of the application processor.

4. The method as set forth in claim 2 wherein 1 step (d) comprises calculating a splitting sequence based on the acceptance rate.

5. The method as set forth in claim 4 wherein step (d) further comprises determining whether calls are accepted or rejected based on the splitting sequence.

6. The method as set forth in claim 2 wherein step (e) comprises incrementing a counter each time a call is accepted.

7. The method as set forth in claim 6 wherein step (e) further comprises estimating CPU occupancy for the second time interval based on the calculating of the CPU occupancy in step (b) and the content of the counter.

8. The method as set forth in claim 7 further comprising calculating an average CPU consumption per call if no overload condition exists.

9. The method as set forth in claim 8 wherein calculating the actual CPU occupancy is based on the contents of the counter.

10. An apparatus comprising:

(a) means for measuring call traffic in a first time interval;

(b) means for calculating CPU occupancy for the first time interval based on the measured called traffic and the uncontrolled portion of the CPU load;

(c) means for calculating a first acceptance rate for the first time interval based on the CPU occupancy;

(d) means for applying the first acceptance rate for a second time interval;

(e) means for estimating CPU occupancy for the second time interval;

(f) means for determining if an overload condition exists based on the estimated CPU occupancy for the second time interval;

(g) means for calculating actual CPU occupancy for the second time interval if the overload condition exists; and, (h) means for calculating a second acceptance rate for the second time interval based on the actual CPU occupancy if the overload condition exists.

* * * * *